(12) United States Patent
Van Dorp

(10) Patent No.: US 10,285,377 B2
(45) Date of Patent: May 14, 2019

(54) ANIMAL POSITION SENSOR

(75) Inventor: Michiel Adriaan Van Dorp, Hazerswoude (NL)

(73) Assignee: LELY PATENT N.V., Maassluis (NL)

( * ) Notice: Subject to any disclaimer, the term of this patent is extended or adjusted under 35 U.S.C. 154(b) by 264 days.

(21) Appl. No.: 13/498,768

(22) PCT Filed: Nov. 9, 2010

(86) PCT No.: PCT/NL2010/000153
§ 371 (c)(1),
(2), (4) Date: Mar. 28, 2012

(87) PCT Pub. No.: WO2011/059315
PCT Pub. Date: May 19, 2011

(65) Prior Publication Data
US 2012/0180729 A1    Jul. 19, 2012

(30) Foreign Application Priority Data
Nov. 13, 2009 (NL) .................... 1037471

(51) Int. Cl.
*A01J 5/007* (2006.01)
*A01J 5/017* (2006.01)

(52) U.S. Cl.
CPC ............. *A01J 5/0175* (2013.01); *A01J 5/007* (2013.01); *A01J 5/017* (2013.01)

(58) Field of Classification Search
CPC .... A01J 5/00; A01J 5/007; A01J 5/017; A01J 5/0175
USPC ..................... 119/14.02, 14.03, 14.08, 14.18
See application file for complete search history.

(56) References Cited

U.S. PATENT DOCUMENTS

| | | | | |
|---|---|---|---|---|
| 4,838,207 A | * | 6/1989 | Bom et al. ................ | 119/14.02 |
| 5,042,428 A | | 8/1991 | Van Der Lely et al. | |
| 5,390,627 A | * | 2/1995 | van der Berg et al. ... | 119/14.08 |
| 5,950,562 A | * | 9/1999 | Schulte ............... | A01K 1/0023 |
| | | | | 119/51.02 |
| 6,167,839 B1 | * | 1/2001 | Isaksson et al. ........... | 119/14.08 |
| 6,213,052 B1 | * | 4/2001 | Oosterling ................ | 119/14.08 |
| 6,269,767 B1 | * | 8/2001 | Hoppe et al. .............. | 119/14.47 |

(Continued)

FOREIGN PATENT DOCUMENTS

| | | |
|---|---|---|
| EP | 0 300 582 | 1/1989 |
| EP | 0 360 354 | 3/1990 |

(Continued)

OTHER PUBLICATIONS

International Search Report dated Jan. 26, 2011 in PCT/NL10/000153 filed on Nov. 9, 2010.

*Primary Examiner* — David J Parsley
(74) *Attorney, Agent, or Firm* — Oblon, McClelland, Maier & Neustadt, L.L.P.

(57) ABSTRACT

A device for automatically milking an animal in an animal space is provided with a robot arm for automatically performing an action on a teat of the animal, a teat sensor, and an animal position sensor for determining the animal position in the animal space. The animal position sensor is movable in a longitudinal direction of the animal space. The animal position sensor is mounted so as to be movable or shiftable in a longitudinal direction of the animal space. This has the advantage that the range of the sensor becomes considerably larger while the sensor can be the same as in a known device.

19 Claims, 2 Drawing Sheets

(56) References Cited

U.S. PATENT DOCUMENTS

| | | | |
|---|---|---|---|
| 6,498,338 B2* | 12/2002 | Oosterling et al. | 250/221 |
| 6,615,764 B2* | 9/2003 | Voogd et al. | 119/51.02 |
| 6,729,262 B2* | 5/2004 | Ealy et al. | 119/14.08 |
| 6,779,486 B2* | 8/2004 | Vaags | A01K 5/0266 |
| | | | 119/51.02 |
| 8,059,869 B2* | 11/2011 | Hallstrom | 382/110 |
| 2003/0168014 A1* | 9/2003 | Aarts | A01J 5/007 |
| | | | 119/14.02 |
| 2008/0125670 A1* | 5/2008 | Signorini | A01K 29/005 |
| | | | 600/551 |
| 2008/0173243 A1* | 7/2008 | Dreyer et al. | 119/14.02 |

FOREIGN PATENT DOCUMENTS

| | | |
|---|---|---|
| EP | 0 657 097 | 6/1995 |
| EP | 1 933 168 | 6/2008 |
| WO | 2007/050012 A1 | 5/2007 |
| WO | 2010 020457 | 2/2010 |
| WO | 2011/023620 A2 | 3/2011 |

\* cited by examiner

ANIMAL POSITION SENSOR

The present invention relates to a device for performing a teat related action on an animal in an animal space, wherein the device is provided with a robot arm for automatically performing an action on a teat of an animal, a teat sensor and an animal position sensor for determining the animal position in the animal space.

Such a device is known from international patent application WO2007/050012 A1. The known device comprises a robot arm which is controlled on the basis of the information obtained from two sensors. One sensor is mounted on the robot arm and serves to determine the teat position and the other sensor is disposed stationarily and serves to determine the cow position in longitudinal direction. A disadvantage of such a device is that the range of the animal position sensor cannot always determine the correct cow position in an efficient manner.

It is an object of the present invention to obviate the abovementioned drawback at least partially, or to provide a usable alternative. This object is achieved by a device as defined in claim 1 which is characterized in that the animal position sensor is movable in a longitudinal direction of the animal space. The sensor is preferably optical, which has the advantage that the animal is not adversely affected by a physical contact. For, this could result in a different, for example restless, etc., behaviour of a dairy animal, which is undesirable.

The invention is characterized in that the animal position sensor, in particular as a whole, is mounted so as to be movable or shiftable in a longitudinal direction of the animal space. This has the advantage that the range of the sensor becomes considerably larger, while the sensor can be the same as for example in the known device. The range is increased by the displacement of the sensor, as a result of which the image can be recorded from different positions. Another advantage of the movable sensor is that the image recording is accurate, because the range of the sensor does not depend on the resolution of the sensor but is increased by different possible positions. It is also possible to mount the animal position sensor in a manner in which it is translatory movable.

In an embodiment of the present invention, the device comprises a carriage which is movable in longitudinal direction and on which the animal position sensor is mounted. An advantage of this embodiment is that the sensor is smoothly displaceable.

In an embodiment of the invention, the robot arm is fastened to the movable carriage. An advantage of this embodiment is that the animal position sensor can be mounted together with the robot arm on the same carriage. The animal position sensor thus occupies less space than when it is positioned on a separate carriage, which, on the other hand, is possible per se. A major advantage is that the robot arm, in the case of a correct positioning of the animal position sensor, will automatically be in a favourable initial position.

The animal position sensor is preferably mounted on the upper side of the animal space, such as on the carriage. This entails the advantage that the animal position sensor is protected against damage or contamination by the animal.

In an embodiment of the invention, the device comprises a guide beam for guiding the animal position sensor along said guide beam. An advantage of this embodiment is that the displacement of the sensor becomes easy and well controllable. The guide beam can preferably form part of an animal space, such as a milking box. The guide beam is advantageously centred, so that the animal position sensor has a broad and good range of view of the animal space.

In an embodiment of the invention, the animal position sensor comprises a 3D camera. An advantage of this embodiment is that the animal position can be determined accurately by converting the distances between the animal and the animal position sensor. As a result thereof, the robot arm receives better information about the cow position and said position can be determined more accurately, so that an even better initial position and robot arm control can be achieved. An advantageous embodiment of the invention is a time-of-flight camera sensor. An advantage of the use of such a sensor is that the information about the cow position is obtained at high speed. In principle, the information can be collected for a whole image field in one go, although this is also possible with a scanning movement. Moreover, this information is very accurate.

In an embodiment of the invention, the device comprises at least two animal spaces, wherein the animal position sensor is movable between an operative position with respect to a first animal space and an operative position with respect to the second animal space. An advantage of this embodiment is that in the milking device having a plurality of animal spaces one animal position sensor can be used, which is cost-saving. This results in fewer components being required and in a more reliable construction. In use, the animal position sensor is at first active for a first space, whereafter the milking in that place can start. Subsequently, the animal position sensor, and the robot arm if desired, switches to the operative position for a second animal space.

In another embodiment of the invention, the device comprises at least two animal spaces that are located one behind the other in longitudinal direction and the animal position sensor is shiftable along said animal spaces. An advantage of this embodiment is that in the milking device having a few animal spaces it is possible to use one animal position sensor, which is for example movable along a common guide beam. This system can furthermore be extended in a simple manner.

In an embodiment of the invention, the device comprises at least two animal spaces that are juxtaposed and the animal position sensor is tiltable. An advantage of this embodiment is that in the milking device having a few animal spaces it is possible to use one animal position sensor, by moving the animal position sensor in a proper manner. This is, for example, possible by tilting between the operative positions of the various animal spaces. This is possible because the animal position sensor is only required for determining an initial position of the animal.

In an embodiment of the invention, the device comprises at least one additional animal position sensor for determining the animal position in the animal space. An advantage of this embodiment is that the animal position can be determined more accurately by the support of the additional animal position sensor, for example by triangulation.

The invention will be explained in further detail with reference to the accompanying drawing. The drawing, which may not be regarded in a restrictive sense, forms a practical embodiment of the invention.

Figure 1:
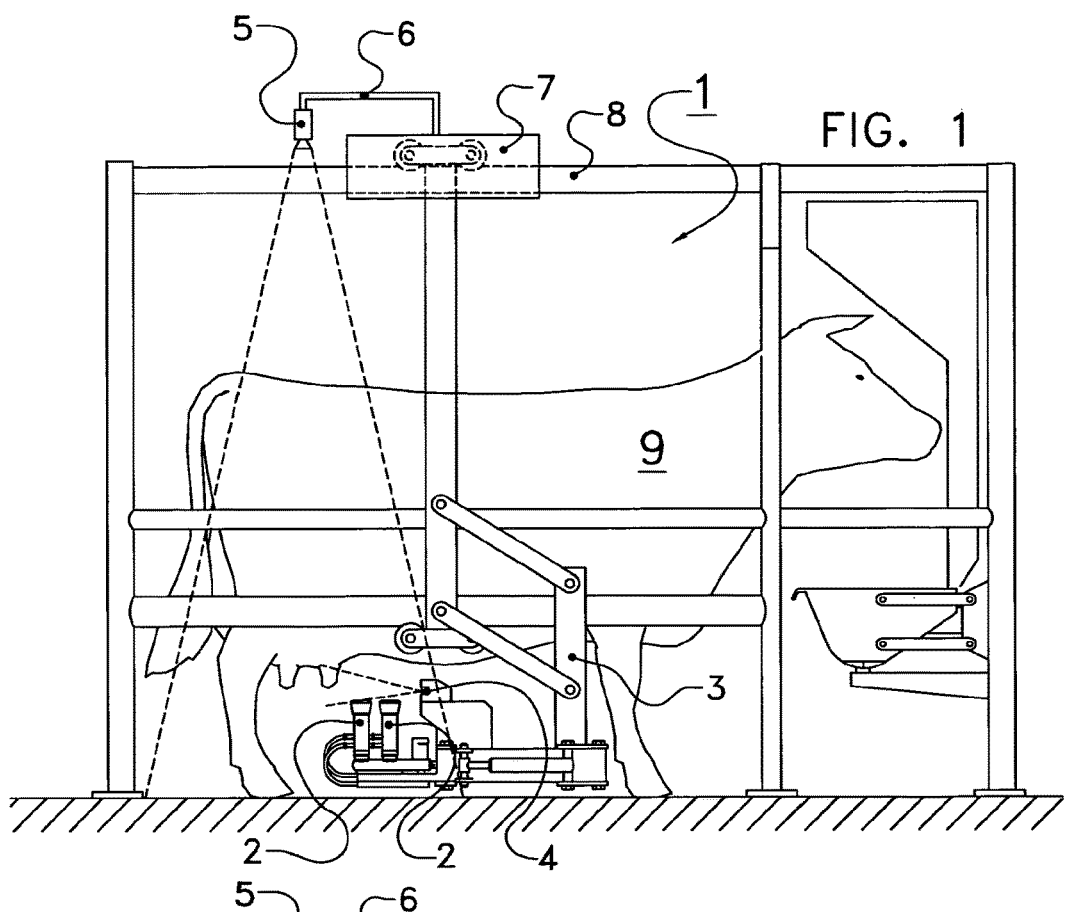
FIG. 1 shows in a schematic view an embodiment of the device with an animal position sensor disposed on a carriage according to the invention.

FIG. 1 shows in a schematic view an embodiment of the device with an animal position sensor disposed on a carriage. A cow 9 is present in an animal space 1, where she is milked by means of teat cups 2 which are mounted on a robot arm 3 and which are connected to the teats of the cow by means of the robot arm. To have the connection process of the teat cups 2 performed in a proper manner, the teat position is determined with the aid of a teat sensor 4 which is, for example, mounted on a lower end of the robot arm 3. The robot arm 3 is shiftable in the longitudinal direction of the device by means of a carriage 7 which is movable, for example, over a guide beam 8. On top of the device there is mounted an animal position sensor 5 which is coupled to the carriage by means of a fastening mechanism 6. The animal position sensor 5 serves for determining the cow position in the animal space 1. An important function of the animal position sensor 5 is the global positioning of the robot arm 3. The animal position sensor is preferably a 3D camera, which entails the advantage that the cow position is determined more accurately. The fastening mechanism is controllable by means of a drive mechanism (not shown), as a result of which the animal position sensor is tiltable.

The mode of operation of the device may be as follows. A cow 9 enters the animal space 1 where the animal position sensor 5 begins to recognize her position. The animal position sensor 5 is preferably mounted on the carriage 7, as a result of which the robot arm 3 is shiftable in longitudinal direction. The robot arm 3 is thus set in movement at the same time. The animal position sensor 5 may also be mounted on a separate carriage, the carriage being shiftable in longitudinal direction. In this case, the carriage of the animal position sensor 5 is set in movement before the robot arm 3 begins to move. In both cases, it is possible to mount the animal position sensor tiltably on the carriage, in order to provide an even larger range for the animal position sensor 5. The tilting of the animal position sensor 5 is preferably performed automatically, in which case the drive mechanism that enables the automatic tilting can make use of different sensors.

By the movement of the robot arm 3, which is shifted over the guide beam 8 in the longitudinal direction of the device by means of the carriage 7, the animal position sensor 5 has a considerably larger range than in the case in which the sensor is fixed to the robot arm. The fastening mechanism 6 of the animal position sensor 5 enables tilting so that the range becomes even larger. The tilting by means of the fastening mechanism 6 is preferably performed automatically. Simultaneously with or after the determination of the position of the cow 9 the teat sensor 4 begins to search for the teats so that the teat cups 2 can be connected to the teats. During the milking the cow can move and therefore her position during the entire milking process will advantageously be recorded with the aid of the animal position sensor 5. Depending on the construction of the robot arm 3, the latter can adapt itself to the cow movements so that the milking process will be performed without disturbance for the cow. As soon as the cow 9 leaves the animal space 1, the robot arm 3 and thus the animal position sensor 5 will assume the initial position.

Figure 2:
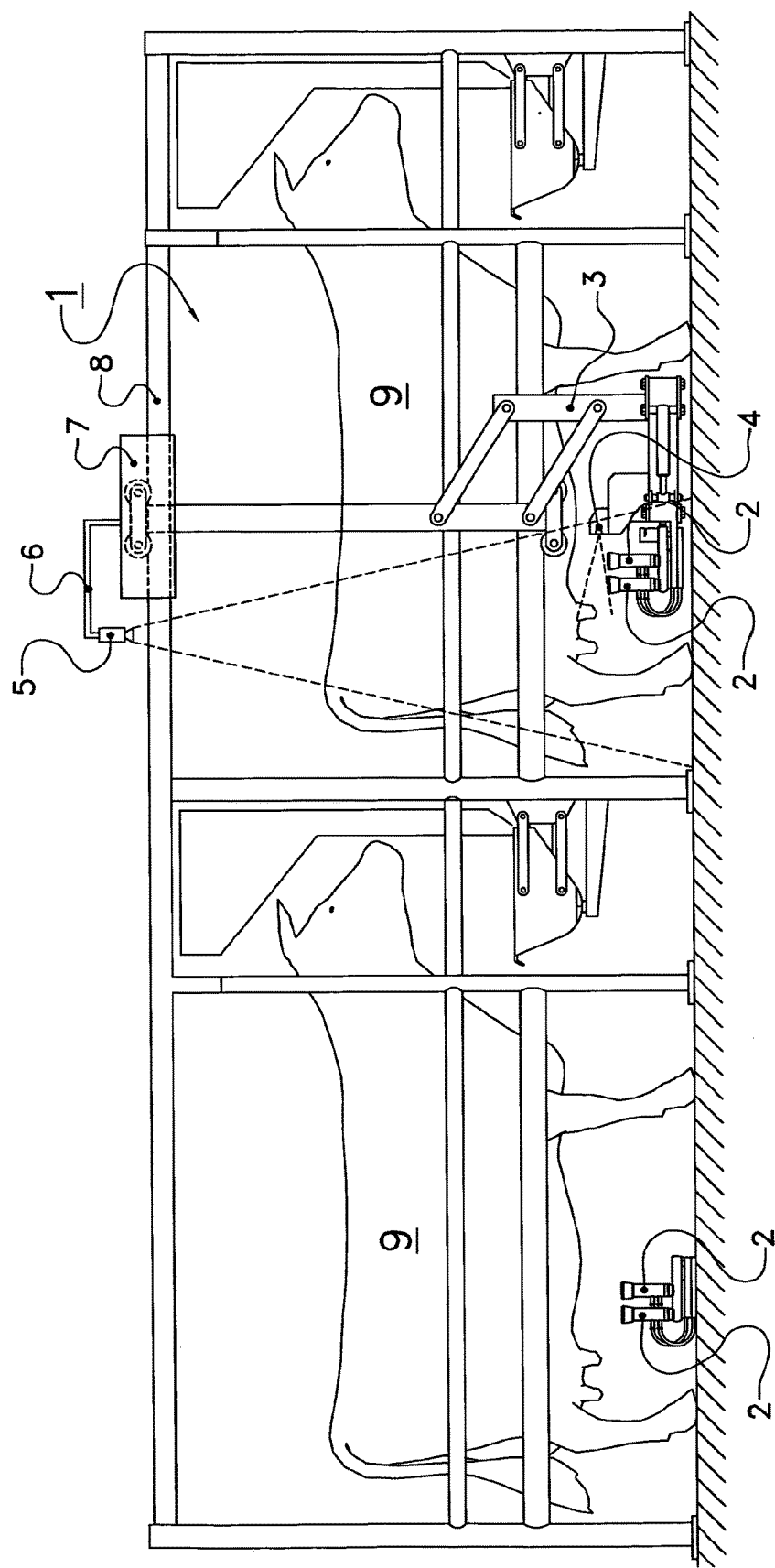
FIG. 2 shows in a schematic view an embodiment of the device with two animal spaces located one behind the other and an animal position sensor that is mounted on the carriage and is shiftable along a common guide beam.

An example of the device with two animal spaces is shown in FIG. 2. The robot arm 3 serves to connect teat cups 2 that are fixed onto the robot arm or are present separately in a cassette in each milking box 1 and are connectable to the robot arm. The cow position determination is performed separately in each milking box with the aid of an animal position sensor 5 which is mounted on its own carriage. The carriage can move in the longitudinal direction of the device over its own guide beam.

Figure 3:
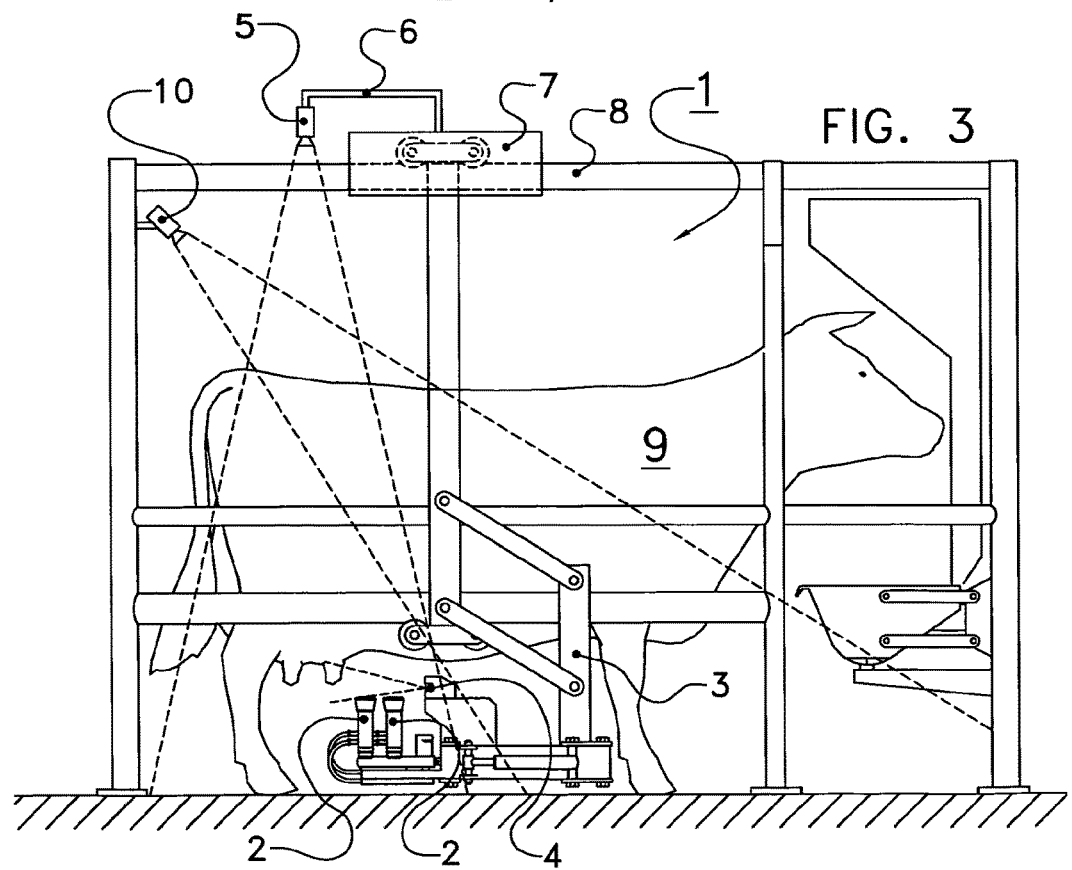
FIG. 3 shows in a schematic view an embodiment of the device with an animal position sensor disposed on a carriage and an additional sensor in the animal space according to the invention.

An example of the device with an animal position sensor 5 on a carriage 7 and an additional sensor 10 in the animal space 1 is shown in FIG. 3. The information about the cow position is determined with the aid of the animal position sensor 5, these data being corrected by the additional sensor 10. The additional sensor 10 may be a 3D camera or another sensor. In this case, triangulation of images of the animal position sensor 5 and the additional sensor 10 can, for example, be used. It is also possible to complete a partially covered image of the animal position sensor 5 by the image of the additional sensor 10.

In addition to the embodiments shown, various variants are possible without thereby departing from the scope of protection, such as is defined in the enclosed claims.

The invention claimed is:

1. A device for performing a teat related action on an animal in an animal milking box, the device comprising:
   a robot arm for automatically performing an action on a teat of the animal;
   a teat sensor; and
   an animal position sensor system for determining an animal position in the animal milking box, wherein the animal position sensor system is located above the animal, is movable in a longitudinal direction in the animal milking box, and there is a space between the animal and the animal position sensor system, and
   wherein the animal position sensor determines a longitudinal position of the animal in the milking box to facilitate the robot arm performing the action on the teat of the animal.

2. The device according to claim 1, wherein the device further comprises a carriage which is movable in the longitudinal direction and to which the animal position sensor system is mounted.

3. The device according to claim 2, wherein the robot arm is fastened to the movable carriage.

4. The device according to claim 2, wherein the animal position sensor system is mounted on top of the carriage.

5. The device according to claim 1, wherein the device comprises a guide beam for guiding the animal position sensor system along said guide beam.

6. The device according to claim 1, wherein the animal position sensor system comprises a 3D camera.

7. The device according to claim 1, wherein the device comprises at least two animal spaces, wherein the animal position sensor system is movable between an operative position with respect to a first of the at least two animal spaces and an operative position with respect to a second of the at least two animal spaces.

8. The device according to claim 1, wherein the device comprises at least two animal spaces that are located one behind the other in longitudinal direction and the animal position sensor system is shiftable along said animal spaces.

9. The device according to claim 1, wherein the device comprises at least two animal spaces that are juxtaposed and the animal position sensor system is tiltable.

10. The device according to claim 1, wherein the device comprises at least one additional sensor for determining the animal position in the animal milking box.

11. The device according to claim 10, wherein the additional animal position sensor system is mounted on the robot arm.

12. The device according to claim 10, wherein at least one additional sensor is disposed stationarily in the animal milking box.

13. The device according to claim 1, wherein at least one additional sensor is mounted movably with respect to an animal milking box.

14. The device according to claim 1, wherein at least one additional sensor is mounted on a separate robot arm.

15. The device according to claim 2, wherein the carriage is movable over a guide beam that is above the animal.

16. A device for performing a teat related action on an animal in an animal milking box, the device comprising:
   a robot arm for automatically performing an action on a teat of the animal;
   a teat sensor; and
   an animal position sensor system for determining an animal position in the animal milking box, wherein the animal position sensor system does not physically contact the animal, is located above the animal, is movable in a longitudinal direction in the animal milking box, and there is a space between the animal and the animal position sensor system, and
   wherein the animal position sensor determines a longitudinal position of the animal in the milking box to facilitate the robot arm performing the action on the teat of the animal.

17. The device according to claim 16, wherein the device further comprises a carriage which is movable in the longitudinal direction and to which the animal position sensor system is mounted.

18. A device for performing a teat related action on an animal in an animal milking box, the device comprising:
   a robot arm for automatically performing an action on a teat of the animal;
   a teat sensor; and
   an animal position sensor system for determining an animal position in the animal milking box,
   wherein the animal position sensor system does not physically contact the animal and is located above the animal,
   wherein the animal position sensor system is movable in a longitudinal direction in the animal milking box, and
   wherein the animal position sensor determines a longitudinal position of the animal in the milking box to facilitate the robot arm performing the action on the teat of the animal.

19. The device according to claim 18, wherein the device further comprises a carriage which is movable in the longitudinal direction and to which the animal position sensor system is mounted.

\* \* \* \* \*